United States Patent [19]
Beden

[11] 3,782,135

[45] Jan. 1, 1974

[54] COUPLING

[76] Inventor: Moses Beden, 466 Union St., Lynn, Mass. 01901

[22] Filed: Feb. 11, 1972

[21] Appl. No.: 225,545

[52] U.S. Cl.......................................... 64/20, 64/19
[51] Int. Cl.............................................. F16d 3/08
[58] Field of Search........................... 64/20, 19, 31; 287/129, 130

[56] References Cited
UNITED STATES PATENTS

| 431,030 | 7/1890 | Boone | 64/20 |
|---|---|---|---|
| 431,039 | 7/1890 | Dodson | 64/20 |
| 2,218,303 | 10/1940 | Smith | 64/20 |
| 3,103,799 | 9/1963 | Berna | 64/20 |
| 2,787,895 | 4/1957 | Kitselman | 64/20 |
| 1,896,133 | 2/1933 | Chilton | 64/20 |
| 2,762,210 | 9/1956 | Redard | 64/20 |
| 3,396,553 | 8/1968 | Potter | 64/31 |

FOREIGN PATENTS OR APPLICATIONS

| 653,122 | 5/1951 | Great Britain | 64/20 |

*Primary Examiner*—Benjamin W. Wyche
*Assistant Examiner*—Randall Heald
*Attorney*—Arthur Z. Bookstein

[57] ABSTRACT

A rotary joint couples a driving and driven shaft to transmit torque with the shafts being rotatably supported at a fixed or variable angle to each other. The coupling includes a collar secured to the proximate ends of each shaft. The collars are connected by a plurality of rods which are freely and slidably received through holes circumferentially spaced and formed through the collars. Each of the rods is bent between its ends in the same angle as that between the shafts. As the driving shaft turns, the rods transmit torque to the driven collar and shaft. During operation the rods slide reciprocally within the holes formed in the collar.

5 Claims, 8 Drawing Figures

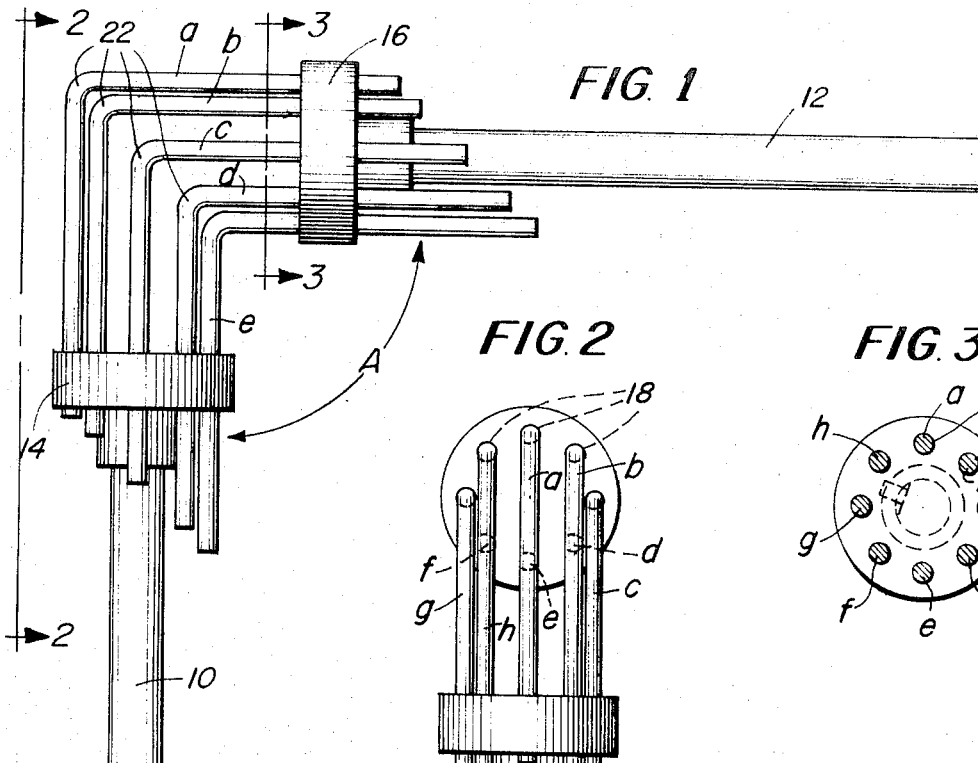
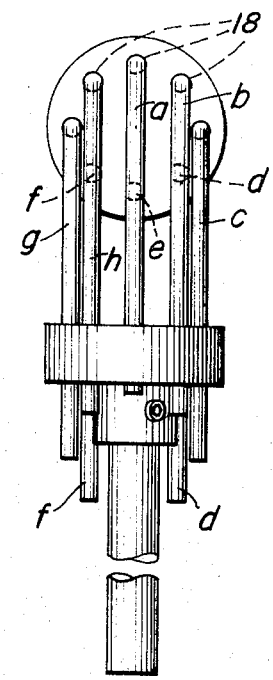
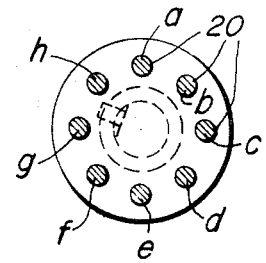
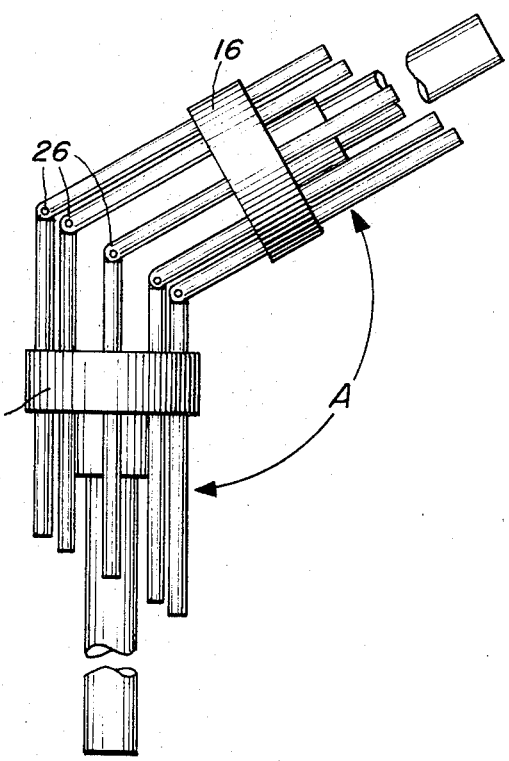
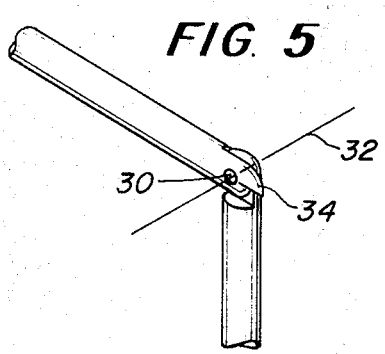

COUPLING

BACKGROUND OF THE INVENTION

This invention relates to shaft couplings adapted to transmit torque between shafts at a fixed angle and also between shafts in which the angle therebetween may vary. The device also allows the axial position of the shaft to be varied or adjusted as a universal joint but over a wider range of angles than conventional universal joints.

SUMMARY OF THE INVENTION

The shafts are provided each with a collar secured to their proximate ends. Each collar is formed with a plurality of circumferentially spaced holes formed therethrough parallel to the shaft axis. The shafts are journaled by conventional means. The shafts are connected by their collars by a plurality of rods, each of which is bent between its ends at an angle substantially identical to that angle between the axes of the shafts. The ends of the rods extend slidably through the receptive holes in the collars so that the ends of the rods parallel the axes of the associated shafts. The bent intermediate region of each rod is disposed between the collars. As the driving shaft and collar are rotated, the rods advance so that their other ends, associated with the driven collar, rotate about the axis of the driven collar and driven shaft and slide reciprocally in the driven collar. The ends of the rods associated with the driving collar similarly reciprocate in relation to the driving collar.

In another embodiment of the invention, the shafts may be mounted so that their relative angle may be varied. With this arrangement the rods are hinged or otherwise constructed for articulation at their mid-portion to enable the rod ends to maintain their parallel relation to their respective shaft axis with each rod maintaining the same angle as that between the shafts. In each embodiment of the invention, the axial position of the shaft and collars may be varied by reason of the slidable engagement of the rods with the collars.

A further aspect of the invention relates to a coupling arrangement adapted to be used between shafts which are rotatably supported along generally paralleling axes but in which the axes are displaced from each other.

It is among the primary objects of the invention to provide a new mechanism for transmitting torque between shafts.

A further object of the invention is to provide a shaft coupling in which the torque is transmitted from the driving to the driven shaft in a balanced manner which reduces the load of the shaft bearing.

Another object of the invention is to provide an improved coupling for transmitting torque between shaft disposed at an angle to each other and which enables axial adjustment of the position of the shafts even while the shafts are rotating.

A further object of the invention is to provide an improved shaft coupling which serves as a universal joint to enable the angle between the shafts to be varied over a considerable wider range of angles than previous universal joints.

DESCRIPTION OF THE DRAWINGS

The foregoing and other objects and advantages of the invention will be understood more fully from the following detailed description thereof, with reference to the accompanying drawings wherein:

FIG. 1 is a plan view of the device;

FIG. 2 is a side view of the device as seen along the line 2—2 of FIG. 1;

FIG. 3 is a sectional view of the device as seen along the line 3—3 of FIG. 1;

FIG. 4 is an illustration of the device similar to that in FIG. 1 in which the angle between the shafts may be varied as in a universal type joint;

FIG. 5 is an enlarged view of an illustrative flexible joint to enable the shaft and coupling angle to be varied;

DESCRIPTION OF THE PREFERRED EMBODIMENT

Figure 6:
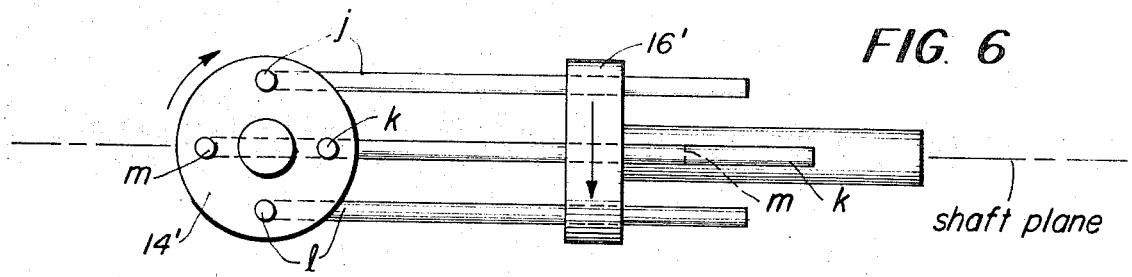
FIG. 6 is an illustration of the invention shown in FIGS. 1-3 having fewer rods for ease of explanation.

FIGS. 1-3 show the invention as employed to couple a driving shaft 10 and a driven shaft 12. The shafts may be mounted for rotation in a wide variety of suitable journals or bearings as is well known to those skilled in the art. The journals are omitted from the drawing for clarity. The embodiment shown in FIGS. 1-3 is described as being employed with shafts 10, 12 which are journaled so that the axes of the shafts 10, 12 are disposed at an angle to each other, with the angle being fixed at all times. As used herein, the term "shaft angle" will refer to the angle A between the axis of the shafts. Additionally, for ease of explanation, the axes of the shafts may be considered as defining a plane which will be referred to as the "shaft plane."

Each of the shafts is provided, at its proximate end, with a collar 14, 16 which is secured firmly to its associated shaft. Each collar 14, 16 extends radially outwardly and has a plurality of holes 18, 20 respectively, formed therethrough in circumferentially spaced relation on the collar. Each of the holes 18, 20 extends substantially parallel to the axis of its respective shaft 10, 12. The collars 14, 16 are connected by a plurality of rods $a$, $b$, $c$, $d$, $e$, $f$, $g$ and $h$. Each of the rods is formed with a bend 22 intermediate its ends, the angle of the bend being identical to the shaft angle A. Each of the rods $a-h$ may be therefore considered as having a driving end and a driven end associated with the driving collar 14 and driven collar 16 respectively. The arrangement is such that the driving and driven ends of each of the rods define a plane which parallels the shaft plane (see FIG. 2). This paralleling relation between the plane in which the rods and shafts lie is maintained throughout operation of the device. The driven end of each rod parallels the axis of the driven shaft 12 and the driving end of each rod similarly parallels the axis of the driving shaft 10.

In operation of the device the driving shaft 10 and collar 14 are rotated to urge each of the driving ends of the rods rotatably with the driving collar 14. Each of the rods transmits a portion of the total torque. The portion of the total torque transmitted by any given rod at a particular time depends on the position of the rod in relation to the shafts. This may be illustrated with reference to FIG. 6 which shows a simplified arrangement having relatively few rods for clarity. From FIG. 6 it may be seen that the rods $j$, $l$ will transmit no torque from the driving to the driven collar. The rods $j, l$ are at a maximum spacing from the shaft plane and, when in this position, the motion of the driven end of the rods $j, l$ is directed parallel to the axis of the driven shaft 12. The directions of axial movement of the driven ends of the rods $j, l$ are in opposition with the rod $j$ being urged toward the driven collar 16' and the diametrically opposed rod $l$ being urged away from the driven collar 16'. As the shafts continue to rotate, the rods $j, l$ rotate toward the shaft plane and transmit a continuously increasing amount of the torque until they are in the shaft plane, such as in the positions of $k, m$ in FIG. 6. The rods in this position transmit their maximum portion of the torque. The total amount of transmitted torque is distributed among all of the rods in a gradient in which the rods nearer the shaft plane transmit increasing amounts of the transmitted torque. Unlike gear arrangements in which a lateral thrust load is imposed on the shafts, the torque applied to the driven collar is self balancing to avoid such lateral loads on the shaft. This enables the shafts to be journaled in simplified, less expensive bearings then would be required with gears.

In addition to the foregoing features, the paralleling arrangement of each shaft and its associated rod ends enables the axial position of the shaft to be adjusted if desired. The device lends itself to axial adjustment of the shaft even while it is operating because the paralleling arrangement of the shaft and associated rod ends is maintained at all times.

FIGS. 4 and 5 show the embodiment of the invention adapted for use as a universal-type coupling which may be employed to transmit torque between shafts in an environment where the shaft angle may be subject to intentional variations or slight misalignment. This embodiment operates in substantially the same manner as the earlier described embodiment except that the rods are articulated instead of rigid. Thus, each of the rods employs a flexible joint 26, etc. at its mid portion to enable the angle between the driving and driven ends of the rods to be varied. FIG. 5 shows, diagrammatically, an illustrative example of such a joint comprising simply of a pin 30 hingedly joining the articulated ends of the rods. The pin 30 is arranged so that the ends of each rod may pivot in relation to each other about an axis 32 which is substantiallyy normal to the shaft plane. This insures that the plane defined by each of the articulated rods will be maintained parallel to the shaft planes to preclude the device from binding. In the embodiment shown, the shaft angle may be varied over a relatively wide range between 90° and slightly less than 180°. In the device shown, it is preferred to preclude pivoting the shaft to a straight line, 180° drive because of the possibility that one or more of the rods may then pivot about its longitudinal axis which could tend to bind the device. This may be achieved by a number of arrangements such as, for example, a stop member 34 secured to one of the rod ends at the hinge region as shown in FIG. 5. The stop 34 may be formed integrally with the articulated region of one of the rods. This variable shaft angle embodiment includes all the features of the earlier described embodiment and functions in substantially the same way.

Figure 7:
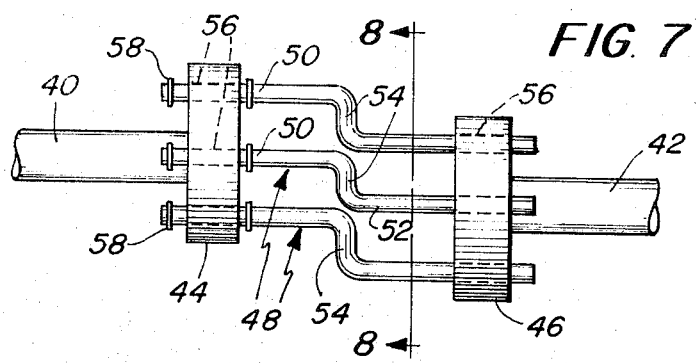
FIG. 7 is an illustration of an embodiment of the invention adapted to couple a pair of generally parallel shafts having their axes displaced laterally.
Figure 8:
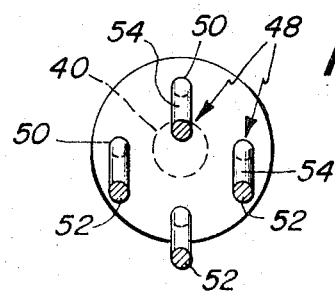
FIG. 8 is an illustration of the device shown in FIG. 7 as seen along the line 8—8 of FIG. 7.

FIGS. 7 and 8 show still another embodiment of the invention which is adapted to transmit torque from a driving shaft 40 to a driven shaft 42 in which the shafts are disposed substantially parallel to but laterally displaced in relation to each other. In this arrangement, the driving and driven collars 44, 46 similarly are displaced. In order to transmit the torque evenly and smoothly to the driven collar 46 and its shaft, a plurality of rods 48 bridge the space between the collars. Each of the rods includes a driving end 50 and a driven end 52 which are substantially parallel but are displaced by an intermediate member 54. The displacement between the driving and driven ends of the rods is substantially the same as the displacement between the axes of the driving and driven shafts 40, 42. The ends of the rods are received in receptive holes 56 formed in the collars for rotation therein. Rotation of the driving shaft and collar will be transmitted to the driven collar through the rods. in this embodiment, by permitting at least one of the collars to be slidable in relation to the rod ends received by it, that collar and its associated shaft may be varied as to its axial position. This may be desirable in instances where it is intended that the distance between the collars be varied either intentionally or otherwise. Normally it is preferred to provide a retaining device, such as a clip 58, on the ends of the rods 48. It should be noted further, that this embodiment may be modified to enable the relative position between the axes of the shafts to be varied by employing an articulated joint such as, for example, that of the type shown in FIG. 5. The joint, in this embodiment, may be provided at the juncture between the driving and driven ends 50, 52 of each rod with the intermediate segment 54 of the rod. This provides for further flexibility of the device.

In the earlier described part of this embodiment, each of the rods lies in and defines a plane substantially parallel to the plane defined by the displaced parallel axis of the shaft and maintains such plane throughout rotation of the unit.

The preferred arrangement for the foregoing embodiments employs an even number of rods arranged in equal circumferential spacing so that each rod has a diametrically opposed rod. This arrangement is more effective to avoid imposing unbalanced transverse lateral forces on the shafts because each pair of diametrically opposed rods imparts a force in direct opposition to its opposite rod. However, in those instances where a degree of lateral force imposed on the shaft may be tolerated or would not adversely affect operation of the device with which it is used, an odd number of rods may be employed, with the minimum number being three.

It should be understood that the foregoing description of the invention is intended merely to be illustrative thereof and that other modifications and embodiments may be apparent to those skilled in the art without departing from its spirit.

Having thus described the invention what I desire to claim and secure by Letters Patent is:

1. A coupling for transmitting rotation from a drive shaft to a driven shaft, said shaft being rotatable about axes displaced from each other and which intersect each other at an angle and define a plane, said coupling comprising:

a collar secured to each of said shafts at the approximate end of said shafts;

a plurality of circumferentially spaced guides fixed to said collars, each of said guides being receptive to a rod and being constructed to support said rod in parallel to the axis of its associated shaft;

a plurality of rods, each rod having a drive end and a driven end, said drive end being slidably received in a guide on said drive collar and said driven end of said rod being slidably received in a guide in the driven of said collars, said ends of said rod extending in parallel to their associated shafts, said rods being disposed in paralleling orientation to each other;

each of said rods being articulated intermediate its ends, the ends of said rods being disposed at an angle substantially identical to the angle between said shafts, said articulations being so constructed and arranged to enable said rods to assume, in unison, the same angle as that between said shaft axes in the event that said shaft angle is varied; and means for precluding said rods from assuming an angle of 180°.

2. A device for transmitting rotation from a drive shaft to a driven shaft, said shaft being rotatable about axes substantially parallel to but displaced from each other, said device comprising:

a collar secured to each of said shafts at the proximate ends of said shafts;

a plurality of rods, each rod having a drive end and a driven end and an intermediate portion connecting said drive and driven ends, said drive end being rotatably received in a guide on said drive collar and said driven end of said rod being rotatably received in the driven of said collars, said ends of said rods extending in parallel to their associated shafts and being freely slidable within and fully through said guide;

said intermediate and end portions of each of said rods being constructed to dispose said ends of said rods parallel to each other and spaced in an amount substantially equal to the spacing of said axes of said shaft;

means for maintaining said rods in paralleling orientation to each other, said rods defining the sole connection between said collars and said shafts.

3. A device as defined in claim 2 wherein said intermediate portion of each of said rods defines a substantially right angle in relation to the ends of said rod.

4. A device as defined in claim 2 further comprising:

means defining an articulated connection between said intermediate portion of each of said rod and the ends of said rods whereby the relative angular position of said shafts may be varied.

5. A coupling as defined in claim 1 further comprising:

said articulations including a pin pivotally connecting the inner adjacent ends of the ends of each of said rods to enable relative pivoting of said ends of said rods about axes which lie perpendicular to said plane defined by said shaft axes.

* * * * *